(12) United States Patent
Lancisi

(10) Patent No.: US 12,507,683 B2
(45) Date of Patent: Dec. 30, 2025

(54) FISHING ROD HANDLE WITH ANGLED PROTUBERANCE

(71) Applicant: Paul F. Lancisi, Port Charlotte, FL (US)

(72) Inventor: Paul F. Lancisi, Port Charlotte, FL (US)

( * ) Notice: Subject to any disclaimer, the term of this patent is extended or adjusted under 35 U.S.C. 154(b) by 81 days.

(21) Appl. No.: 18/207,022

(22) Filed: Jun. 7, 2023

(65) Prior Publication Data
US 2024/0407348 A1 Dec. 12, 2024

(51) Int. Cl.
*A01K 87/08* (2006.01)

(52) U.S. Cl.
CPC .................... *A01K 87/08* (2013.01)

(58) Field of Classification Search
CPC .............................. A01K 87/08; A01K 97/10
USPC .................................. 43/23, 20, 22
See application file for complete search history.

(56) References Cited

U.S. PATENT DOCUMENTS

| | | | | |
|---|---|---|---|---|
| 2,046,191 A * | 6/1936 | Smith | ................... | A63B 60/00 473/203 |
| D108,721 S * | 3/1938 | Morgan | ..................... | D22/142 |
| D208,978 S * | 10/1967 | Kirk | ........................... | D22/142 |
| 4,916,848 A * | 4/1990 | Childre | ................. | A01K 87/08 43/22 |
| 4,920,682 A * | 5/1990 | Andreasen | ............ | A01K 87/08 43/22 |
| 5,337,507 A * | 8/1994 | Oyama | ................... | A01K 87/08 43/22 |
| 5,363,585 A * | 11/1994 | Ohmura | ................ | A01K 87/08 43/18.1 R |
| 6,029,389 A * | 2/2000 | Newton | ................ | B25G 1/102 43/21.2 |
| 6,098,333 A * | 8/2000 | Wickizer | ............... | A01K 87/08 43/23 |
| 6,105,302 A * | 8/2000 | Yamamoto | ............ | A01K 87/08 43/23 |
| 6,973,750 B1* | 12/2005 | Kim | ....................... | A01K 87/08 43/23 |
| 2008/0244956 A1* | 10/2008 | Gant | ....................... | A01K 97/06 43/23 |
| 2017/0013816 A1* | 1/2017 | Huang | .................... | A01K 87/08 |
| 2018/0020649 A1* | 1/2018 | Kotarsky | ............... | A01K 87/08 43/23 |
| 2021/0144982 A1* | 5/2021 | Osoreda | .................. | A01K 87/08 |
| 2021/0144983 A1* | 5/2021 | Osoreda | ........... | A01K 89/01925 |
| 2021/0259226 A1* | 8/2021 | Rabbitt | ................... | A01K 87/08 |
| 2023/0082885 A1* | 3/2023 | Kawamura | ............ | A01K 87/08 43/18.1 R |
| 2023/0145014 A1* | 5/2023 | Dalton | ................... | A01K 87/08 43/23 |

\* cited by examiner

*Primary Examiner* — Zoe Tam Tran

(74) *Attorney, Agent, or Firm* — Anthony D. Pellegrini

(57) ABSTRACT

A handle for a fishing rod, said handle having a grip and one or more angled circumferential protuberances, with each angled circumferential protuberance located on the grip between the opposite ends of the handle, and with each angled circumferential protuberance configured to provide a support to a user's hand grasping the handle for purposes of casting.

19 Claims, 10 Drawing Sheets

FISHING ROD HANDLE WITH ANGLED PROTUBERANCE

BACKGROUND OF THE INVENTION

The present invention relates to fishing rods in general, and specifically to the handles of fishing rods.

The standard configuration of a fishing rod handle is well known in the art. They are typically elongate, cylindrical, and located at one end of a fishing rod. The basic configuration of a fishing rod handle is designed to facilitate it being grasped by a human hand. While grasping a fishing rod handle, a user of the fishing rod can cast, reel in line, jig the line, or simply hold the fishing rod. To facilitate these activities, fishing rod handles may be contoured, may have grips placed thereon, may have projections for grasping with a finger, or have other design details. These design features tend to improve the user's ability to hold a fishing rod, jig the line, and reel in line, but really do not improve a user's ability to cast a fishing line or provide for accommodation for diminished hand and/or arm function.

Casting a fishing line with a fishing rod is an activity that requires a quick, sharp movement of the fishing rod, and in particular the end of the fishing rod opposite the fishing rod handle. This movement is primarily achieved by a snapping of the wrist of the user's hand that is grasping the fishing rod handle, in conjunction with a movement of the user's arm. These movements produce forces on the user's hand that may result in fatigue, or loss of control, or other less than desirable results, causing casting deficiencies of the fishing line. With increased fatigue, even the simple act of merely holding the fishing rod can become difficult. For example, a person struggling with tennis elbow may experience pain when casting. Someone who is arthritic, or possibly handicapped in the hand portion of the body, may not be able to obtain a sufficient grip on the handle. Heavy duty, deep-sea fishing rods place an extraordinary amount of pressure on the hand, making it difficult to hold onto the fishing rod.

It is thus shown that an improved fishing rod handle is needed that provides a user with a better means for casting fishing line with a fishing rod, and for holding a fishing rod.

It is therefore an object of the present invention to provide a fishing rod handle that provides a user with an improved means for casting fishing line with a fishing rod.

It is a further object of the present invention to provide a fishing rod handle that provides a user with an improved means for holding a fishing rod.

It is yet a further object of the present invention to provide a fishing rod handle that can reduce fatigue in the hand of a user of the fishing rod.

It is yet a further object of the present invention to provide a fishing rod handle that can reduce pain in the hand of a user of the fishing rod.

It is yet a further object of the present invention to provide a fishing rod handle that can be used with any type of fishing rod.

Other objects of the present invention will be readily apparent from the description that follows.

SUMMARY OF THE INVENTION

The improved fishing rod handle of the present invention comprises an angled circumferential protuberance located between the opposite ends of the fishing rod handle. The user of the fishing rod grasps the handle just in front of the protuberance, such that the heel and side of the user's hand rests against the front face of the protuberance. When casting, the protuberance prevents the hand from sliding down the handle. It helps alleviate pain when casting and it helps reduce fatigue when casting or simply holding the fishing rod, because the user does not need to grasp the fishing rod handle so tightly, thereby reducing strain on the ulnar nerve. The protuberance provides greater torque to the casting motion. It also provides a tremendous amount of leverage for the user. In an alternative embodiment there may be two protuberances disposed along the handle of the fishing rod, allowing the user to grasp the fishing rod with both hands.

The protuberance of the improved fishing rod handle is an ergonomic feature that reduces compression on the wrist and hand, resulting in increased grip connection, increased leverage, improved accuracy, and increased power for casting at any angle. The biomechanical connection between the hand and the improved fishing rod handle make the fishing rod feel like it is an extension of the user's arm.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims incorporated herein.

DETAILED DESCRIPTION OF THE INVENTION

Figure 1A:
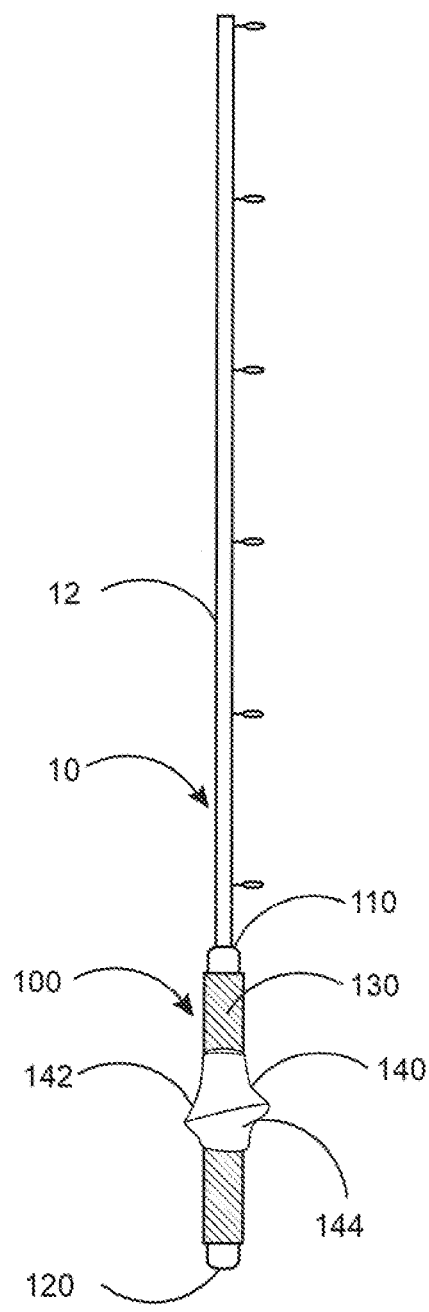
FIG. 1A is a left side view of one embodiment of the present invention.
Figure 1B:
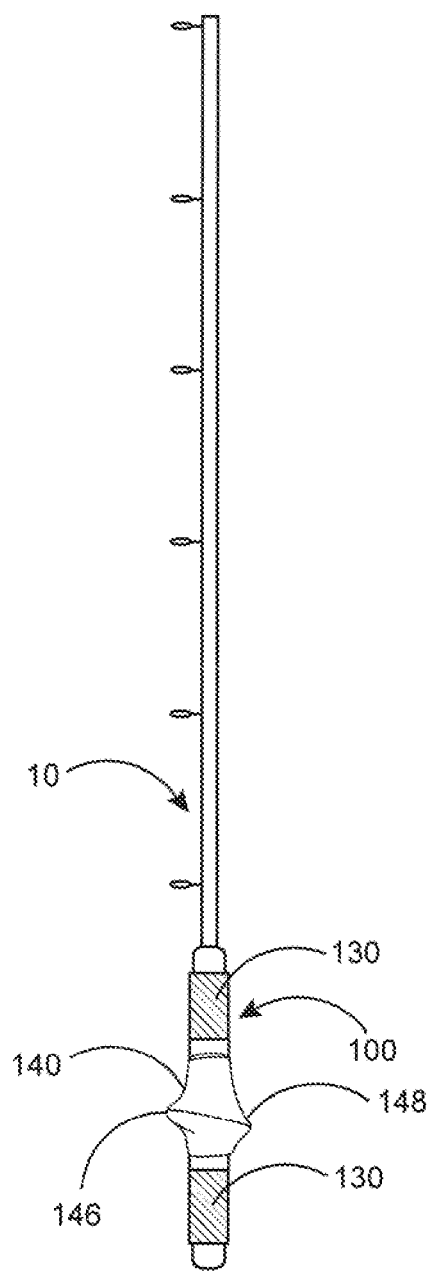
FIG. 1B is a right side view of the embodiment of the present invention shown in FIG. 1A.
Figure 2:
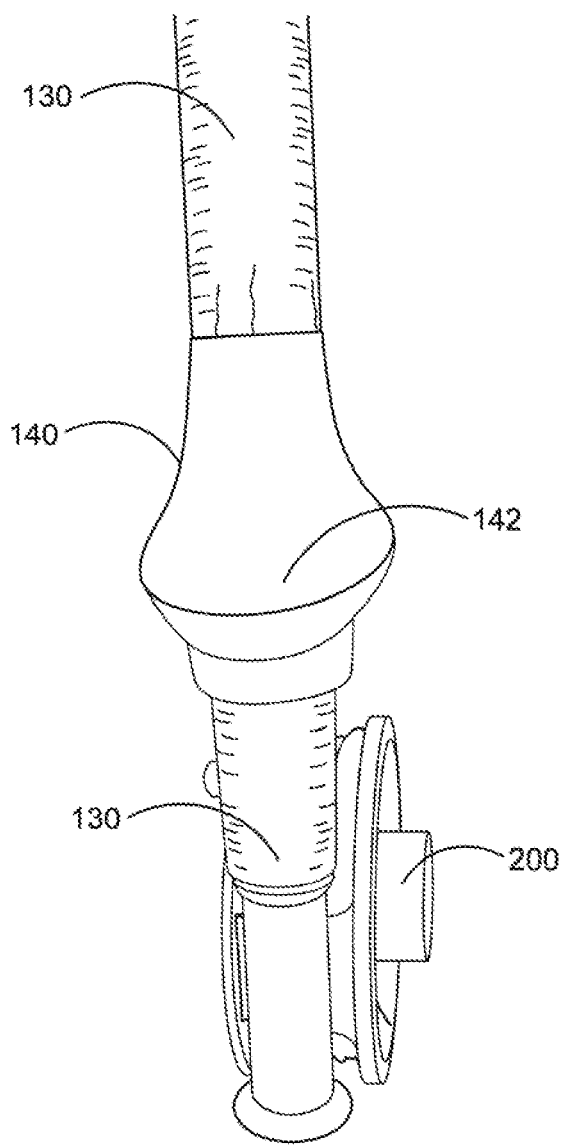
FIG. 2 is a top view of one embodiment of the present invention.
Figure 3:
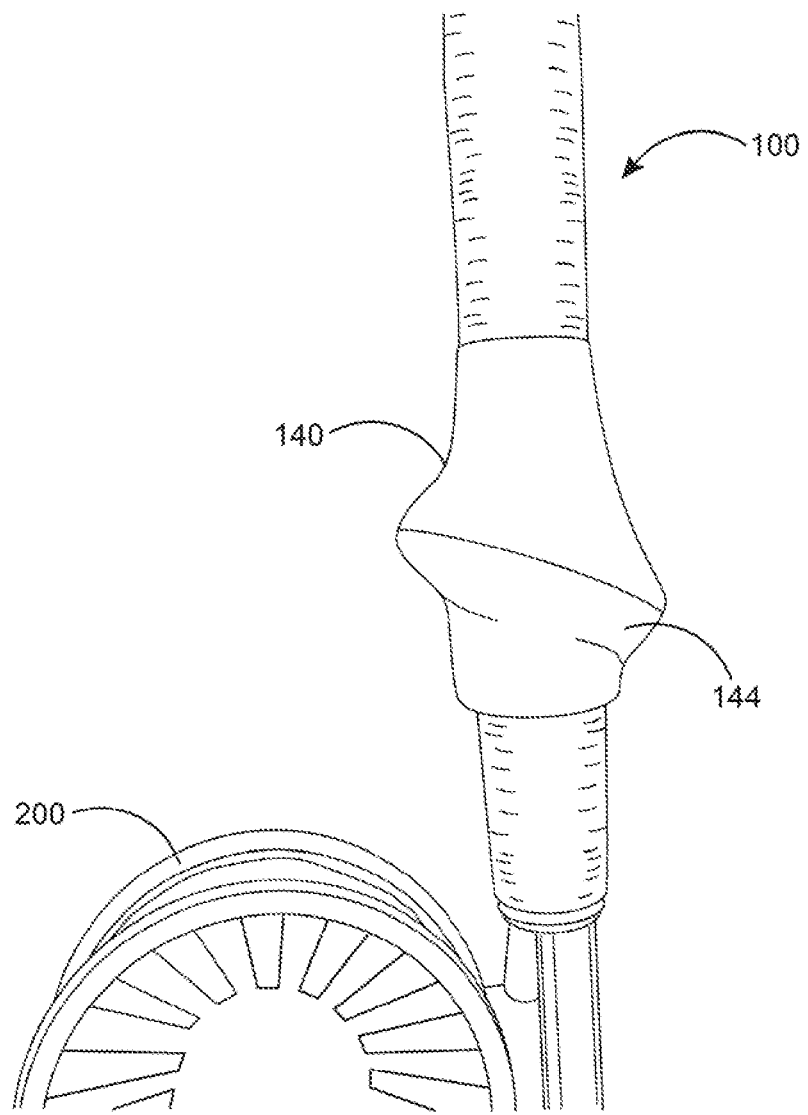
FIG. 3 is a left side view of the embodiment of the present invention shown in FIG. 2.
Figure 4:
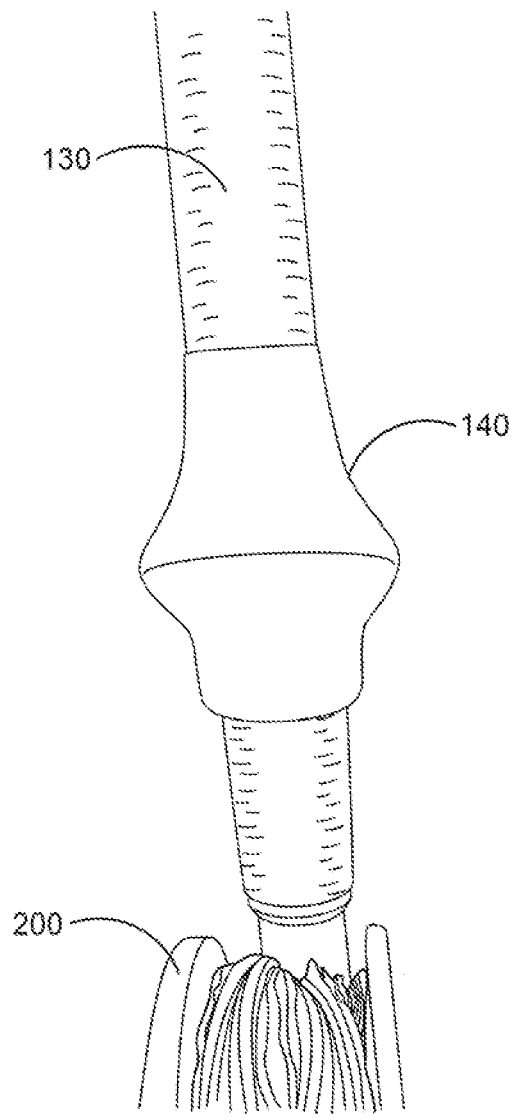
FIG. 4 is a bottom view of the embodiment of the present invention shown in FIG. 2.
Figure 5:
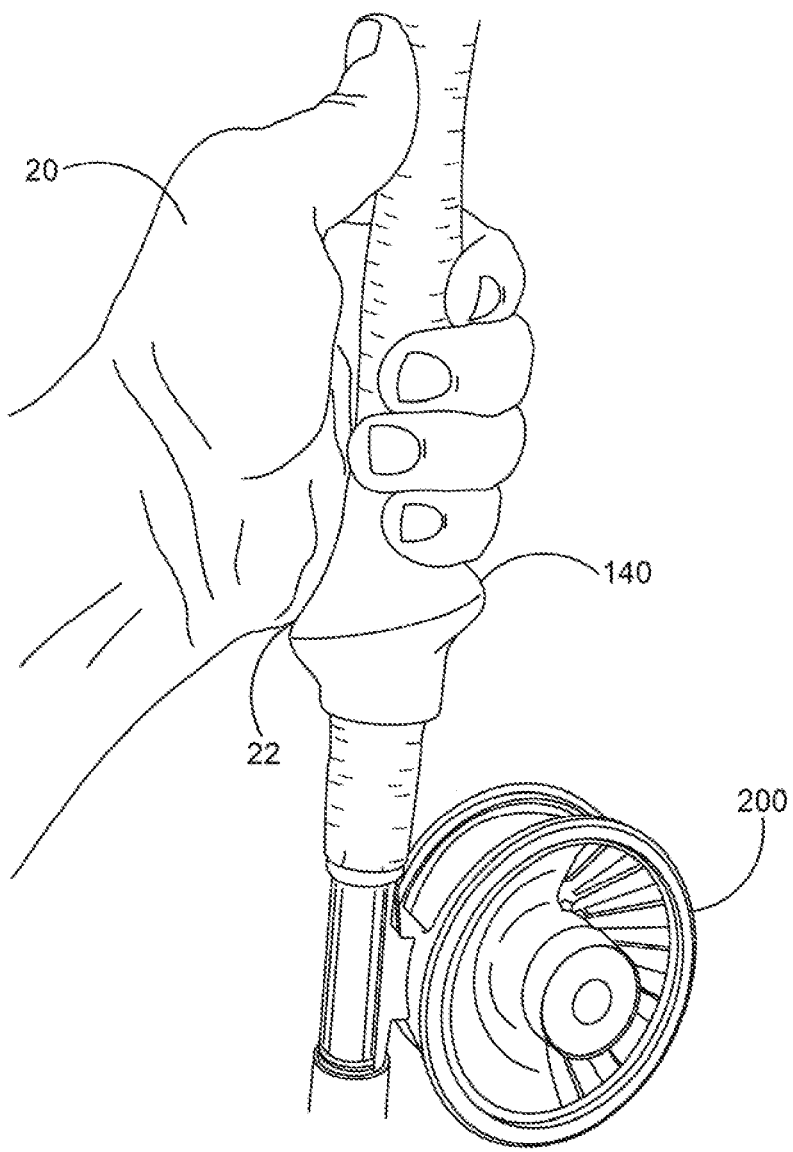
FIG. 5 is a right side view of the embodiment of the present invention shown in FIG. 2, depicted as being held by a human hand.
Figure 6:
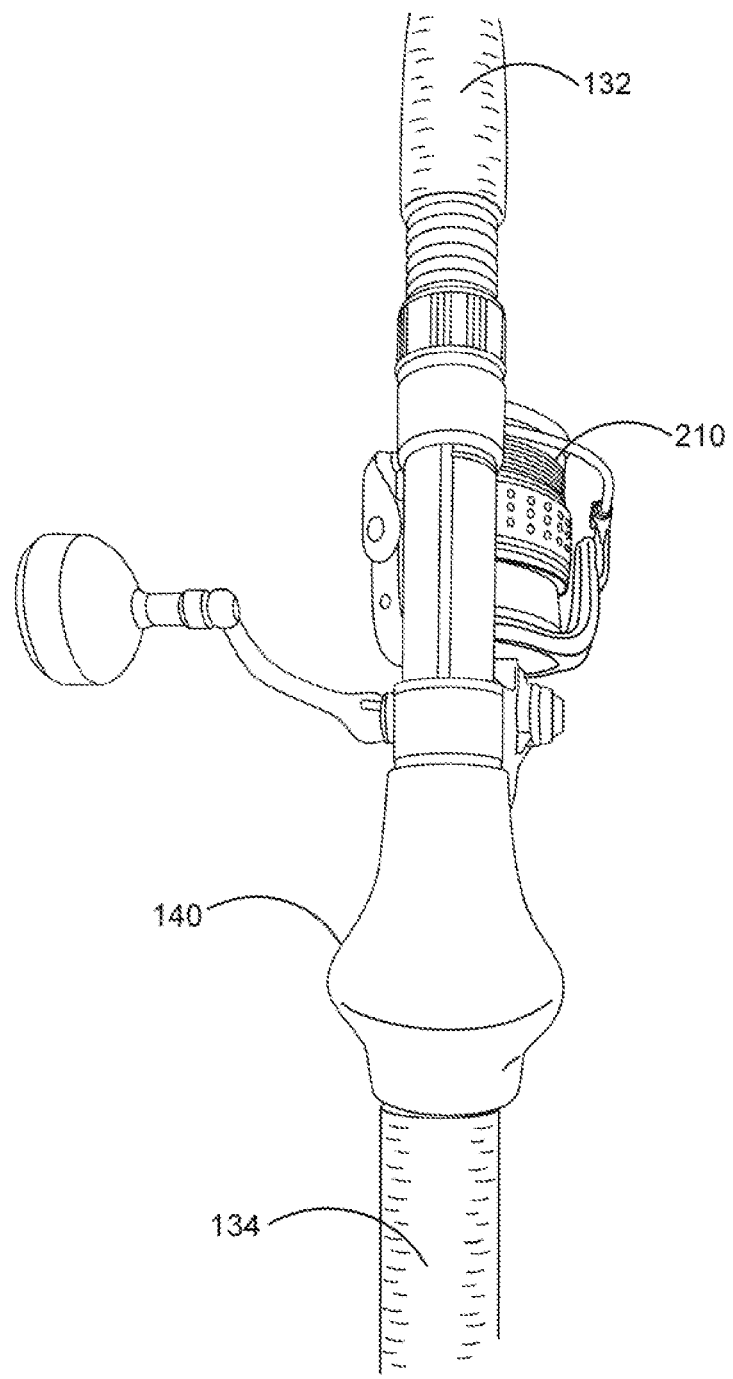
FIG. 6 is a top view of another embodiment of the present invention.
Figure 7:
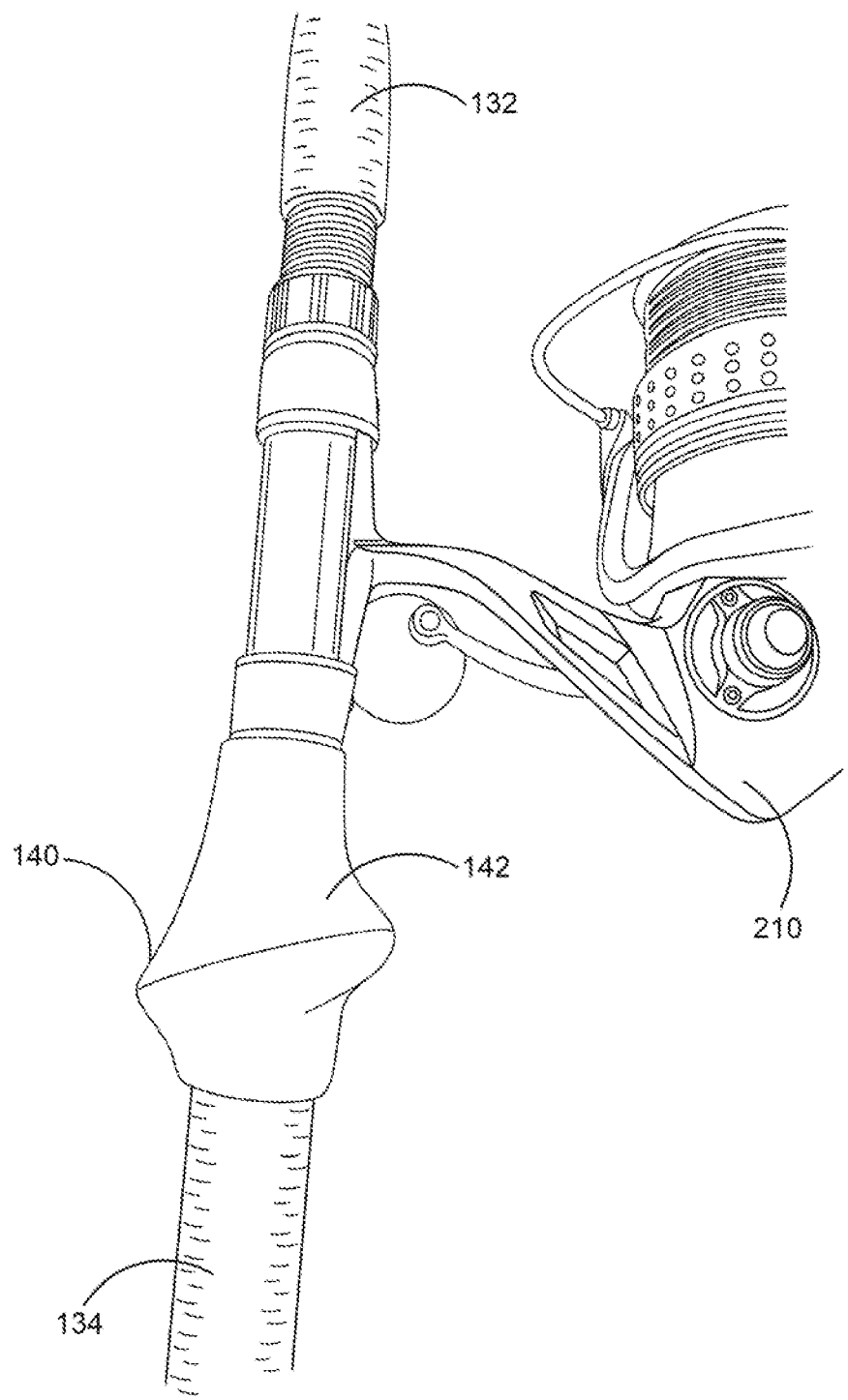
FIG. 7 is a right side view of the embodiment of the present invention shown in FIG. 6.
Figure 8:
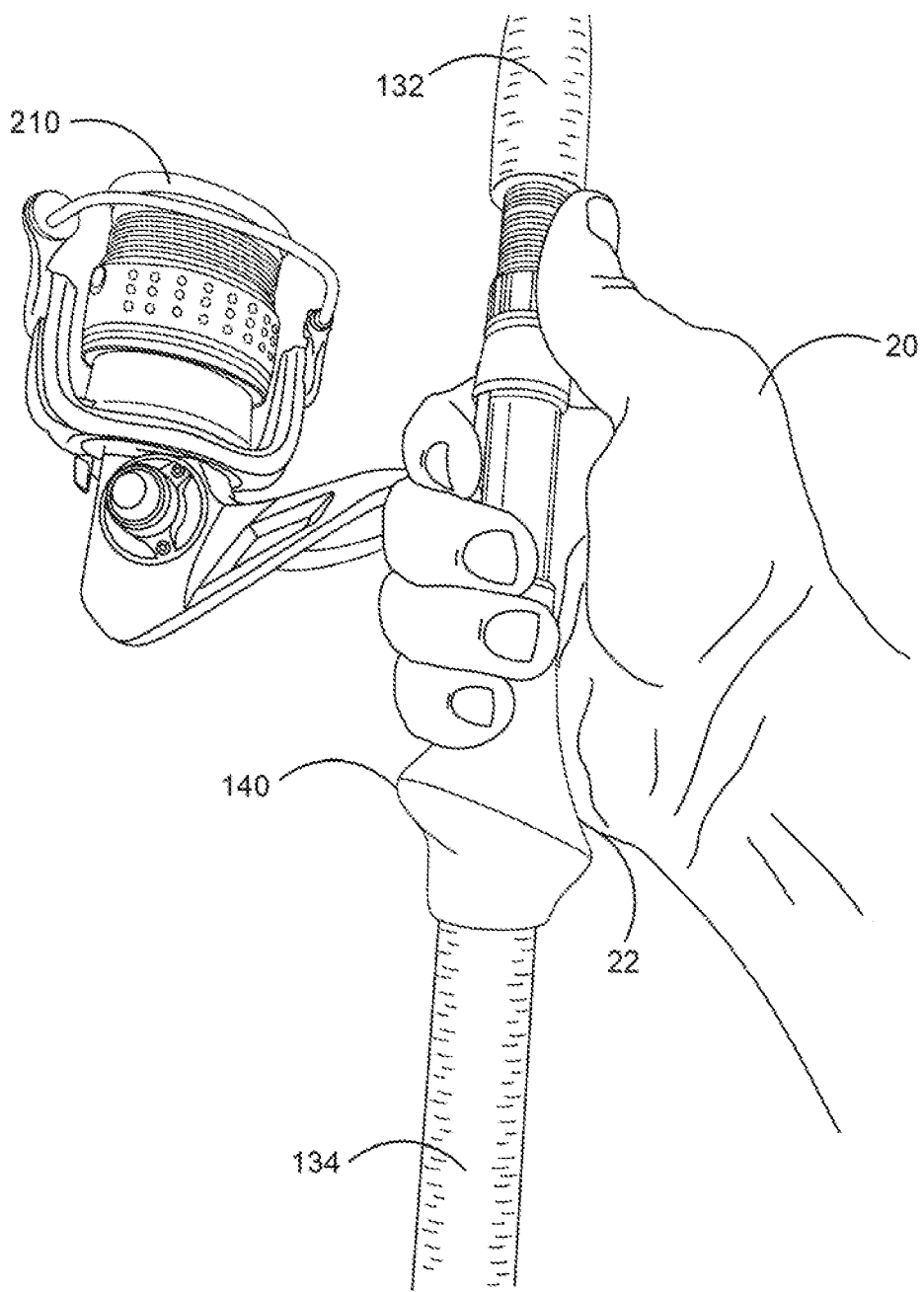
FIG. 8 is a left side view of the embodiment of the present invention shown in FIG. 6, depicted as being held by a human hand.
Figure 9:
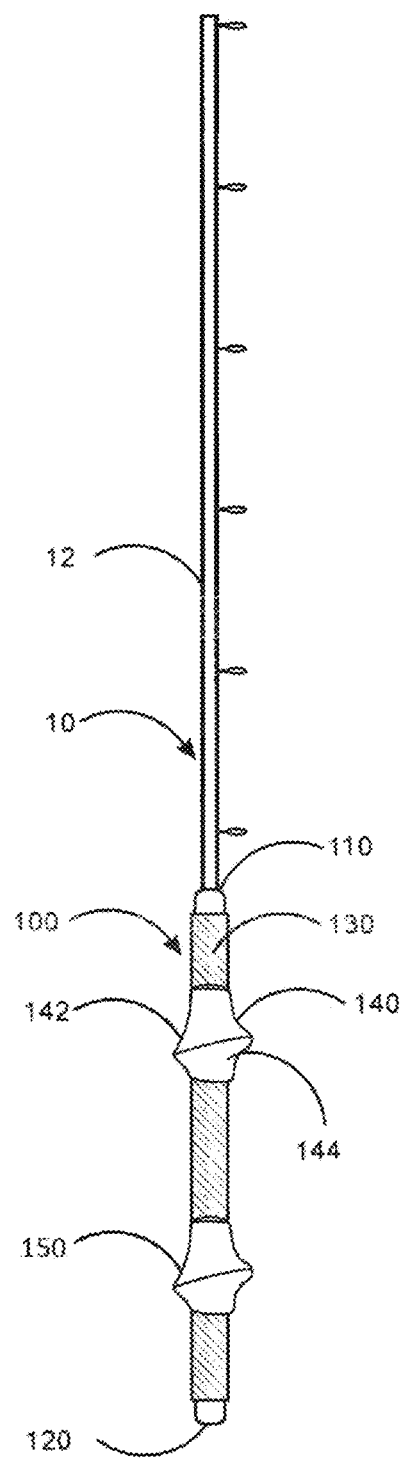
FIG. 9 is a left side view of another embodiment of the present invention, having a first and second protuberance.

The present invention is disclosed in one embodiment as a handle 100 for a fishing rod 10. The fishing rod 10 may be any kind of fishing rod 10 used for casting, such as a fly fishing rod or a spin casting rod. The present invention comprises a new component added to the handle 100 of a fishing rod 10 that improves the user's ability to cast.

The handle 100 itself is configured as any handle 100 known in the art, in that it is elongate and has an attachment end 110 and a butt end 120. The attachment end 110 of the handle 100 is located opposite the butt end 120 of the handle 100. The handle 100 is located at one end of the fishing rod 10, and is attached to the remaining portion 12 of the fishing rod 10 at its attachment end 110. The handle 100 preferably also has a grip 130. The grip 130 is any type of grip 130 known in the art. A typical grip 130 may be made of cork, or a rubberized material, or a synthetic material. The purpose of the grip 130 is to facilitate the grasping of the handle 100 by a human hand 20. The grip 130 may be a unitary grip, as is typically found on a fly fishing rod, or a split grip, having a forward portion 132 and a butt portion 134, where the forward portion 132 of the grip 130 is spaced apart from the butt portion 134 of the grip 130. The split grip configuration is typically found on a spin casting fishing rod.

The novel improvement over the known configurations of a handle 100 to a fishing rod 10 is the addition of an angled circumferential protuberance 140. The protuberance 140 may be round and symmetrical, or it may be oval shaped and asymmetrical. The protuberance 140 is configured to provide support to a hand 20 grasping the handle 100. Specifically, the metacarpal portion 22 of the hand 20 (that portion of the hand 20 between the fingers and the wrist, and in particular the side edge of the palm) is placed in contact with the protuberance 140 to achieve a better grasp on the handle 100. The little finger of the hand 20 may also be supported by the protuberance 140.

The protuberance 140 has a front face 142 and a rear face 144. The front face 144 of the protuberance 140 is oriented towards the attachment end 110 of the handle 100. The rear face 144 of the protuberance 140 is oriented towards the butt end 120 of the handle 100. As described above, the human hand 20 is supported against the front face 142 of the protuberance 140.

In one embodiment, the protuberance 140 is located on the grip 130 of the handle 100, positioned between the attachment end 110 of the handle 100 and the butt end 120 of the handle 100. In this configuration, typically used for a fly fishing rod, a reel 200 is located on the handle 100 between the protuberance 140 and the butt end 120 of the handle 100.

In another embodiment where the handle 100 has a split grip configuration, the protuberance 140 is located on the handle 100 between the forward portion 132 of the grip 130 and the butt portion 134 of the grip 130. In this configuration, typically used for a spin casting fishing rod, a reel 210 is located on the handle 100 between the forward portion 132 of the grip 130 and the butt portion 134 of the grip 130 and forward of the protuberance 140 (between the protuberance 140 and the attachment end 110 of the handle 100).

In either of the unitary grip or split grip configurations, the protuberance 140 is oriented at an angle to the longitudinal axis of the handle 100. A first portion 146 of the protuberance 140 is oriented towards the attachment end 110 of the handle 100 and a second portion 148 of the protuberance 140 is oriented towards the butt end 120 of the handle 100. The second portion 148 of the protuberance 140 is located on the opposite side of the handle 100 as the first portion 146 of the protuberance 140. Side portions of the protuberance 140 are located between the first portion 146 and the second portion 148 of the protuberance 140 and are oriented laterally to the handle 100.

The first portion 146 of the protuberance 140 is oriented at a first angle to the longitudinal axis of the handle 100. The second portion 148 of the protuberance 140 is oriented at a second angle to the longitudinal axis of the handle 100. In the preferred embodiment, the second angle is the same as the first angle. In the most preferred embodiment, the first portion 146 of the protuberance 140 is oriented at a twenty-three degree angle to the longitudinal axis of the handle 100, and the second portion 148 of the protuberance 140 is oriented at a twenty-three degree angle to the longitudinal axis of the handle 100. In other embodiments, the angle of inclination of the first portion 146 of the protuberance 140 may be greater or less than twenty-three degrees to the longitudinal axis of the handle 100, and the angle of inclination of the second portion 148 of the protuberance 140 may be greater or less than twenty-three degrees to the longitudinal axis of the handle 100.

The material used in constructing the protuberance 140 may be rigid or semi-rigid (whereby in the latter case it has some give). In the embodiments whereby the protuberance 140 is rigid, it may be formed as a unitary component from fiberglass, polyvinyl chloride (PVC), acrylonitrile butadiene styrene (ABS), wood, carbon fiber, nylon, aluminum, stainless steel, or polycarbonate. In embodiments where the protuberance 140 is semi-rigid, it may be made of rubber, cork, soft plastic, or ethylene-vinyl acetate (EVA) foam.

In one embodiment of the present invention, there may be a second protuberance 150 located on the handle 100. The second protuberance 150 is configured the same as the first protuberance 140 as described above. The use of a pair of protuberances 140,150 allows the user to grasp the handle 100 with both hands.

Modifications and variations can be made to the disclosed embodiments of the present invention without departing from the subject or spirit of the invention as defined in the following claims.

I claim:

1. A handle for a fishing rod,
said handle being elongate and having an attachment end and a butt end, with the attachment end located opposite the butt end, said handle located at one end of said fishing rod, with said handle attached to a remaining portion of said fishing rod at the attachment end of said handle,
said handle comprising
a grip, and
a first protuberance, said first protuberance having a front face oriented towards the attachment end of said handle and a rear face oriented towards the butt end of said handle, wherein the first protuberance is circumferentially located on the grip between the attachment end of the handle and the butt end of the handle;
whereby
said first protuberance is configured to provide support to a human hand grasping said handle, whereby a metacarpal portion of said hand is in contact with the front face of said first protuberance.

2. The handle of claim 1 wherein
the first protuberance is oriented at an angle to the longitudinal axis of the handle, whereby a first portion of the first protuberance is oriented towards the attachment end of the handle and a second portion of the first protuberance is oriented towards the butt end of the handle, with the second portion of the first protuberance located on an opposite side of the handle as the first portion of the first protuberance.

3. The handle of claim 2 wherein
the first portion of the first protuberance is oriented at a first angle to the longitudinal axis of the handle, and the second portion of the first protuberance is oriented at a second angle to the longitudinal axis of the handle.

4. The handle of claim 3 wherein the second angle is the same as the first angle.

5. The handle of claim 3 wherein the first angle is twenty-three degrees to the longitudinal axis of the handle.

6. The handle of claim 3 wherein the second angle is twenty-three degrees to the longitudinal axis of the handle.

7. The handle of claim 1 wherein
the grip of the handle is comprised of a forward portion and a butt portion, with the forward portion of the grip located proximate to the attachment end of the handle and the butt portion of the grip located proximate to the butt end of the handle, with the forward portion of the grip spaced apart from the butt portion of the grip,
wherein the first protuberance is circumferentially located on the handle between the forward portion of the grip and the butt portion of the grip.

8. The handle of claim 7 wherein
the first protuberance is oriented at an angle to the longitudinal axis of the handle, whereby a first portion of the first protuberance is oriented towards the attachment end of the handle and a second portion of the first protuberance is oriented towards the butt end of the handle, with the second portion of the first protuberance located on an opposite side of the handle as the first portion of the first protuberance.

9. The handle of claim 8 wherein
the first portion of the first protuberance is oriented at a first angle to the longitudinal axis of the handle, and
the second portion of the first protuberance is oriented at a second angle to the longitudinal axis of the handle.

10. The handle of claim 9 wherein the second angle is the same as the first angle.

11. The handle of claim 9 wherein the first angle is twenty-three degrees to the longitudinal axis of the handle.

12. The handle of claim 9 wherein the second angle is twenty-three degrees to the longitudinal axis of the handle.

13. The handle of claim 1 further comprising
a second protuberance, said second protuberance having a front face oriented towards the attachment end of said handle and a rear face oriented towards the butt end of said handle, wherein the second protuberance is circumferentially located on the grip between the attachment end of the handle and the butt end of the handle;
whereby
said second protuberance is configured to provide support to a human hand grasping said handle, whereby a metacarpal portion of said hand is in contact with the front face of said second protuberance.

14. The handle of claim 13 wherein the second protuberance is spaced apart from the first protuberance.

15. The handle of claim 14 wherein
the second protuberance is oriented at an angle to the longitudinal axis of the handle, whereby a first portion of the second protuberance is oriented towards the attachment end of the handle and a second portion of the second protuberance is oriented towards the butt end of the handle, with the second portion of the second protuberance located on an opposite side of the handle as the first portion of the second protuberance.

16. The handle of claim 15 wherein
the first portion of the second protuberance is oriented at a first angle to the longitudinal axis of the handle, and
the second portion of the second protuberance is oriented at a second angle to the longitudinal axis of the handle.

17. The handle of claim 16 wherein the second angle of the second protuberance is the same as the first angle of the second protuberance.

18. The handle of claim 16 wherein the first angle of the second protuberance is twenty-three degrees to the longitudinal axis of the handle.

19. The handle of claim 16 wherein the second angle of the second protuberance is twenty-three degrees to the longitudinal axis of the handle.

* * * * *